(12) United States Patent
Lefebvre-Pautigny et al.

(10) Patent No.: US 12,502,022 B2
(45) Date of Patent: Dec. 23, 2025

(54) BEVERAGE PREPARATION DEVICE WITH SIMPLE MULTI-THERMAL CONDITIONING

(71) Applicant: SOCIETE DES PRODUITS NESTLE S.A., Vevey (CH)

(72) Inventors: Florent Lefebvre-Pautigny, Publier (FR); Alain Teklits, Corsier (CH)

(73) Assignee: Societe des Produits Nestle S.A., Vevey (CH)

( * ) Notice: Subject to any disclaimer, the term of this patent is extended or adjusted under 35 U.S.C. 154(b) by 927 days.

(21) Appl. No.: 17/596,777

(22) PCT Filed: Jun. 19, 2020

(86) PCT No.: PCT/EP2020/067054
§ 371 (c)(1),
(2) Date: Dec. 17, 2021

(87) PCT Pub. No.: WO2020/254545
PCT Pub. Date: Dec. 24, 2020

(65) Prior Publication Data
US 2022/0225820 A1    Jul. 21, 2022

(30) Foreign Application Priority Data
Jun. 20, 2019    (EP) .................................... 19181432

(51) Int. Cl.
*A47J 31/56*    (2006.01)
*A47J 31/22*    (2006.01)
(Continued)

(52) U.S. Cl.
CPC ............... *A47J 31/56* (2013.01); *A47J 31/22* (2013.01); *A47J 31/407* (2013.01); *A47J 31/52* (2013.01)

(58) Field of Classification Search
CPC ...... A47J 31/407; A47J 31/461; A47J 31/468; A47J 31/52; A47J 31/54; A47J 31/605;
(Continued)

(56) References Cited

U.S. PATENT DOCUMENTS 2,838,077 A    6/1958    Cooper
4,211,342 A    7/1980    Jamgochian et al.
(Continued)

FOREIGN PATENT DOCUMENTS

CN    102970908 A    3/2013
CN    106714631 A    5/2017
(Continued)

OTHER PUBLICATIONS

Chinese Office Action for Appl No. 202080042863.9 dated Jul. 30, 2023.
(Continued)

*Primary Examiner* — Elizabeth M Kerr
*Assistant Examiner* — Simpson A Chen
(74) *Attorney, Agent, or Firm* — K&L Gates LLP

(57) ABSTRACT

A machine for preparing a beverage (3) from a flavouring ingredient (2) has a beverage processing unit (10,20) with: a holder (10) delimiting a mixing chamber (11) in which the flavouring ingredient is received, held and mixed with water (4) during beverage preparation; and a water inlet (22) configured to guide water (4) into the mixing chamber (11) where it is mixed with the flavouring ingredient (2) to form the beverage (3). The machine (1) has a thermal conditioner (30) that has a body (31) with: a guide (32) for guiding the water (4) towards the beverage processing unit (10,20); and a thermal device (33) that is able to be powered to thermally conditioning the guide (32). The machine (1) has a liquid driving arrangement (5) with: a driving mode to drive the water (4); and a stationary mode. The machine has a control (Continued)

unit (7) to control the thermal device (33) and the driving arrangement (5), the control unit (7) being selectively in: a first control mode in which the thermal device (33) is powered so that the water (4) located along the guide (32) is thermally conditioned; and a second control mode different to the first control mode. The control unit (7) has a selection arrangement for selecting one of a first beverage preparation mode using the first control mode and a second beverage preparation mode using the second control mode. In the second control mode the thermal device is unpowered or powered at a powering level that is significantly below a powering level of the thermal device (33) in the first control mode. Upon selection via the selection arrangement (71) of the second beverage preparation mode, the control unit (7) is configured to switch the driving arrangement (5) from the stationary to the driving mode and/or maintain the driving arrangement (5) in the driving mode.

19 Claims, 2 Drawing Sheets

(51) Int. Cl.
*A47J 31/40* (2006.01)
*A47J 31/52* (2006.01)

(58) Field of Classification Search
CPC .. A47J 31/56; A47J 31/22; A23L 2/54; A23V 2002/00
USPC .......................................................... 99/281
See application file for complete search history.

(56) References Cited

U.S. PATENT DOCUMENTS

| 5,372,061 | A  | * | 12/1994 | Albert | A47J 31/46 99/281 |
| 2006/0005712 | A1 | * | 1/2006 | Greenwald | A47J 31/56 99/275 |
| 2006/0207432 | A1 | * | 9/2006 | Van Der Meer | A47J 31/52 99/279 |
| 2012/0125205 | A1 | * | 5/2012 | Glucksman | A47J 31/32 99/302 R |
| 2012/0137893 | A1 | * | 6/2012 | Casado Gomez | A47J 31/56 99/290 |
| 2014/0007776 | A1 |   | 1/2014 | Mori et al. | |
| 2015/0289709 | A1 | * | 10/2015 | Picozza | A47J 31/4492 99/280 |
| 2015/0305546 | A1 | * | 10/2015 | Perentes | A47J 31/22 99/302 C |
| 2017/0367526 | A1 | * | 12/2017 | Avins | A47J 31/5253 |

FOREIGN PATENT DOCUMENTS

| JP | S62164424 A | 7/1987 |
| JP | 2005230218 A | 9/2005 |
| JP | 2016504082 A | 2/2016 |
| RU | 2241364 C1 | 12/2004 |
| WO | 2012007260 | 1/2012 |

OTHER PUBLICATIONS

Russian Office Action for Appl No. 2022100584/03 dated Oct. 25, 2023.
Japanese Office Action for Application No. 2021-573932 dated Mar. 12, 2024.

* cited by examiner

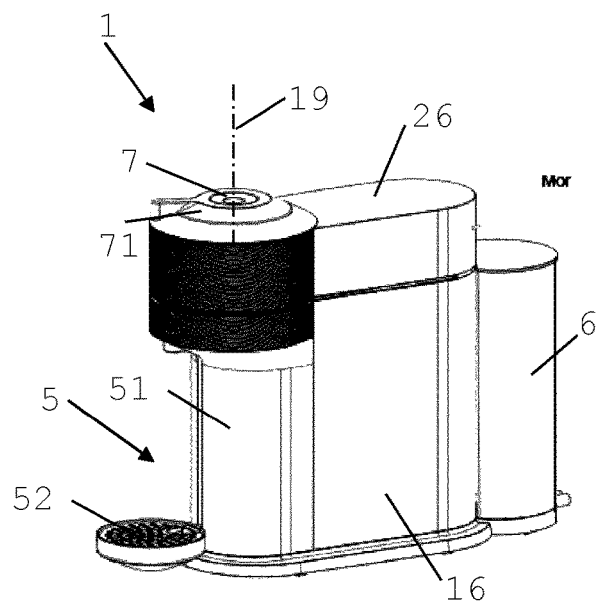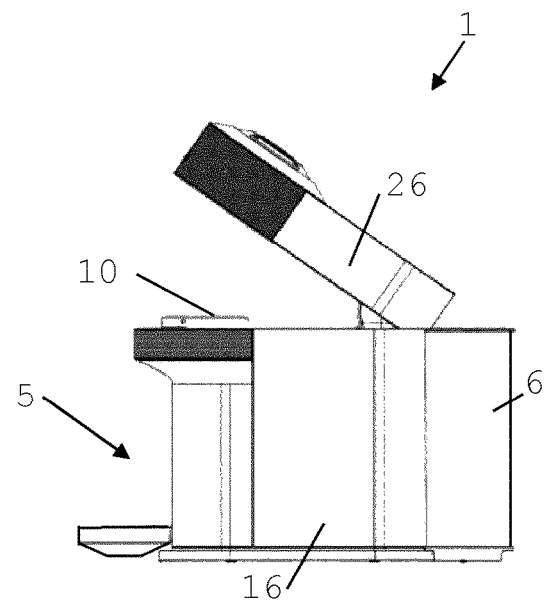
Fig. 1　　　　　Fig. 1a
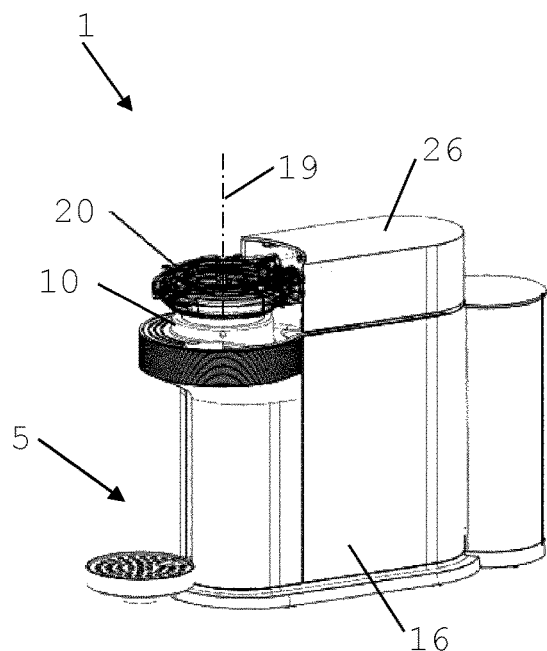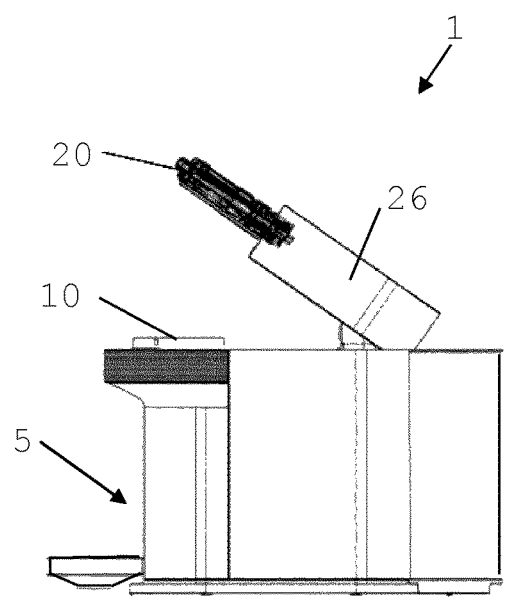
Fig. 2　　　　　Fig. 2a

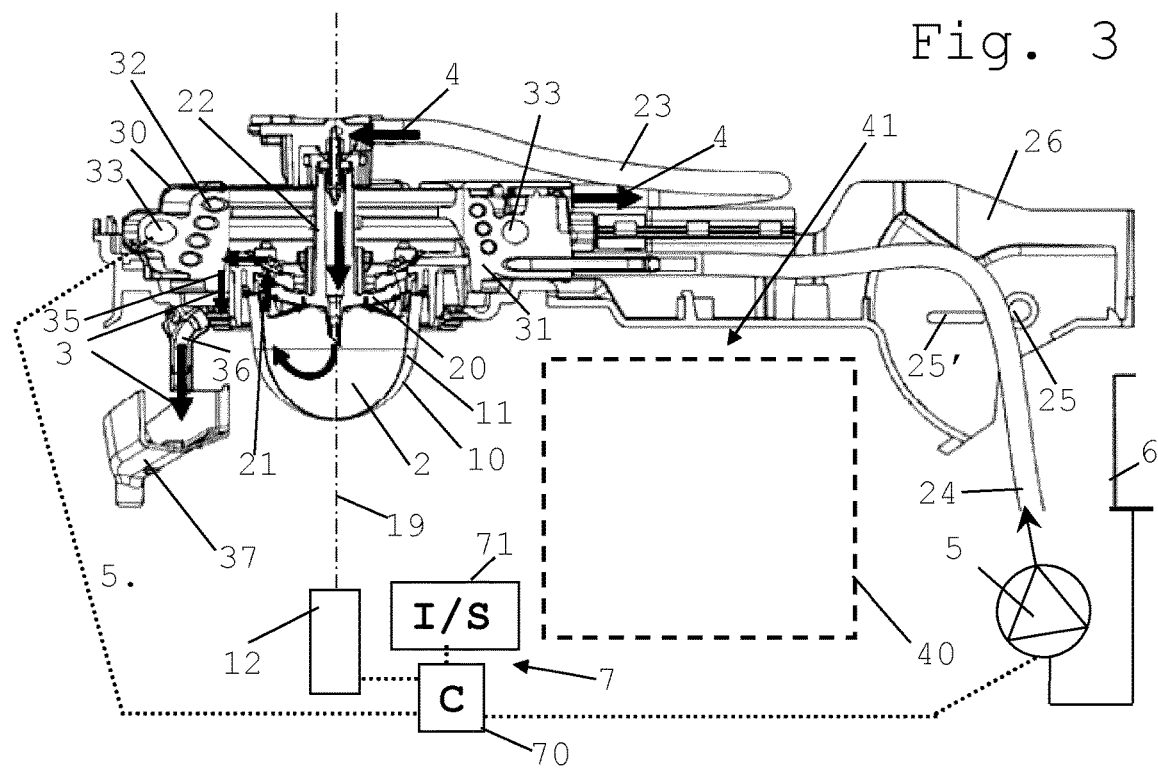
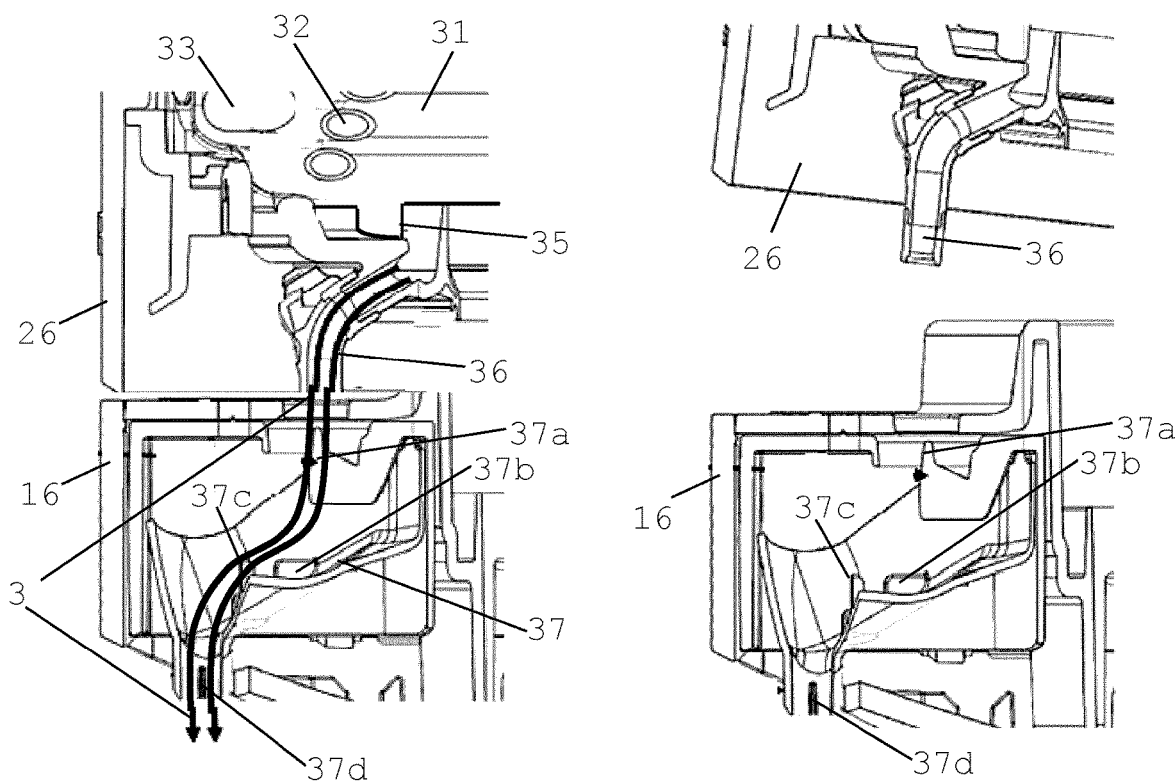
Fig. 3
Fig. 4   Fig. 4a

BEVERAGE PREPARATION DEVICE WITH SIMPLE MULTI-THERMAL CONDITIONING

CROSS REFERENCE TO RELATED APPLICATIONS

The present application is a National Stage of International Application No. PCT/EP2020/067054, filed on Jun. 19, 2020. which claims priority to European Patent Application No. 19181432.6, filed on Jun. 20, 2019, the entire contents of which are being incorporated herein by reference.

FIELD OF THE INVENTION

The field of the invention pertains to beverage preparation machines which uses thermally conditioned liquid, such as heated and/or cooled liquid. The liquid is typically water or water-based. The machine may be configured to prepare the beverage by passing the liquid through an ingredient of the beverage to be prepared, such as at least one of coffee, tea, cacao, milk, sugar and/or soup ingredient. The ingredient may be supplied within a capsule into the machine. For instance, the liquid is mixed with the ingredient contained in the capsule by centrifuging the capsule while the liquid is passed through the capsule.

For the purpose of the present description, a "beverage" is meant to include any human-consumable liquid substance, such as tea, coffee, hot or cold chocolate, milk, soup, baby food, etc. . . . . A "capsule" is meant to include any container such as a packaging for containing a pre-portioned beverage ingredient, e.g. a flavouring ingredient, the packaging forming an enclosure of any material, in particular an airtight or pervious material, porous or non-porous material, e.g. plastic, aluminium, recyclable and/or biodegradable packagings, and of any shape and structure, including soft pods or rigid cartridges for containing the ingredient.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

The preparation of a beverage by using centrifugation is known. Such beverage preparation includes: providing a beverage (flavoring) ingredient, e.g. as powder and/or leaves, in a capsule; circulating liquid into the capsule and rotating the capsule at sufficient speed to ensure interaction of the liquid with the ingredient while creating a gradient of pressure of liquid in the capsule. Such pressure increases gradually from the center towards the periphery of the capsule. As liquid traverses the ingredient, e.g. coffee bed, extraction of the ingredient, e.g. coffee compounds, takes place and a liquid extract is obtained that flows out at the periphery of the capsule. Examples of such systems are disclosed in WO2008/148601, WO 2013/007776, WO 2013/007779 and WO 2013/007780.

When no appropriate measure is taken, centrifugal systems suffer the inconvenience that the liquid extract discharged from the device is exposed to significant heat exchange with the environment which leads to a beverage that can be significantly colder or hotter than desired. In particular, the liquid extract can cool down (if the liquid is previously heated) or warm up (if the liquid is previously cooled) in the collecting device by heat exchange with the large surfaces of the collector of the device. This results from the fact that the brewing unit is rotated along a central axis to form a thin layer or jets of liquid impacting on a substantially tubular impact surface. The liquid comes in contact with and drip from a surface that can be equal, for instance, to a first impact surface which, when it is cylindrical, may have a surface area of at least about 500 mm$^2$. Furthermore, if the liquid is then collected in a substantially U-shaped cavity that leads to a dispensing duct, such cavity forms again extensive areas of contact with the extracted liquid. Furthermore, the receptacle such as a cup further cools the liquid down unless it has been heated before being placed under the device for the reception of the liquid.

Furthermore, certain beverage ingredients, such as roast and ground coffee or tea, must be brewed with a heated liquid, e.g., hot water, within a particular range of temperature to ensure the full extraction of the ingredients including the capture of the desired aroma compounds. Therefore, the liquid supplied in the brewing unit cannot be overheated to compensate for the temperature losses endured by the liquid after extraction as it would negatively affect the quality of extraction. The range of temperatures for an optimal brewing such as for coffee or tea must be so respected for ensuring the best quality of the final beverage. Furthermore, other quality characteristics of the coffee beverage must be preserved during preparation such as the head of foam called "crema".

It is already known from EP 2393404 A1 to compensate for a temperature loss in a device as described above by using additional heating elements, but these devices are very complex.

Advantageous systems to manage the temperatures of the liquid before mixing it with the beverage flavouring ingredient and of the resulting beverage are disclosed in WO 2010/089329 and in WO 2014/090850.

It is also known to interrupt or reduce the powering of the thermal conditioner of a beverage machine to reduce the powering consumption of the machine when not in the process of delivering a beverage, e.g. as disclosed in WO 2011/020779 and WO 2012/007260.

It is also know to bypass a thermal conditioner to process thermally unconditioned water for a desired beverage preparation, e.g. as disclosed in WO 2018/158179.

There is still a need to optimise the thermal management of water used for preparation a flavoured beverage.

SUMMARY OF THE INVENTION

The invention relates to a machine for preparing a beverage from at least one ingredient. Normally such beverage is then dispensed to a user, e.g. to a user-cup or user-mug.

For instance, the machine is a coffee, tea, chocolate, cacao, milk or soup preparation machine.

The machine is arranged for preparing the beverage by mixing water with the flavouring ingredient, e.g. by centrifugally driving such flavouring ingredient with the water or by maintain the flavouring ingredient substantially stationary while it is exposed to water. Examples of devices for the latter type (stationary type) of beverage preparation are disclosed in WO 2005/004683 and in WO 2007/135136.

The beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 15 to 1000 ml such as 25 to 600 ml for instance 40 to 250 ml, e.g. the volume for filling a cup or mug, depending on the type of beverage. Formed and dispensed beverages may be selected from ristrettos, espressos, lungos, cappuccinos, café latte, americano coffees, teas, etc. . . . . . For example, a coffee machine may be configured for dispensing espressos, e.g. an adjustable volume of 20 to 60 ml per serving, and/or for dispensing lungos, e.g. a volume in the range of 70 to 200 ml per serving, and/or for dispensing americanos, e.g. a volume in the range of 150 to 750 ml.

The machine includes a beverage processing unit that has a holder delimiting a mixing chamber in which the flavouring ingredient is received, e.g. within a capsule, held and mixed with the water during beverage preparation. For instance, the holder has an upwardly or sidewardly or slantingly oriented mouth via which the flavouring ingredient is received in the holder.

In an embodiment, the flavouring ingredient is supplied into the mixing chamber within a capsule.

The capsule can have a capsule flange that extends generally in parallel to the mouth.

The capsule may have a body containing an ingredient and a peripherally projecting flange. The capsule may be of the type described above under the header "field of the invention". The capsule may be a capsule that has a container-body, e.g. a generally cup-shaped or hemispherical or hemi-ellipsoidal body, having a flange to which a cover lid is attached, in particular sealed. Typically, the capsule contains a beverage ingredient.

The capsule may have a or the above body that is symmetric or asymmetric, conical or frusto-conical, pyramidal or frusto-pyramidal, cylindrical or prismatic, spherical or hemispherical or frusto-spherical, domical or frusto-domical, containing the ingredient.

The beverage processing unit has: a beverage outlet arrangement configured to deliver the beverage from the mixing chamber; and a water inlet configured to guide water into the mixing chamber where it is mixed with the flavouring ingredient to form the beverage.

The machine has a thermal conditioner, such as a heater and/or a cooler, that has a body comprising: a guide, such as a duct, for guiding the water towards the beverage processing unit; and a thermal device, such as an electric thermal device, that is able to be powered to thermally conditioning the guide so as to thermally condition the water guided by the guide. For instance, the thermal device includes a heat remover and/or a heat generator, such as at least one of a thermocouple, a heat pump, a resistive heater e.g. a discrete resistor and/or a thick film heater, and an inductive heater.

The machine includes a liquid driving arrangement having: a driving mode to drive the water, e.g. from a water source such as a water tank and/or an external water supply line, along the guide of the thermal conditioner and into the inlet; and a stationary mode in which the water remains substantially stationary along the guide of the thermal conditioner and optionally in the inlet. For instance, the driving arrangement in the stationary mode is inactive or is active merely to pressurise the water towards the inlet (without substantially displacing the water). Hence, in the stationary mode, the water remains stationary in the guide unpressurised or pressurised. A pressurisation of the stationary water can be obtained by activating the driving arrangement.

The machine has a control unit, such as a control unit comprising a controller and/or processor, configured to control the thermal device and the driving arrangement. Other functions may be controlled by the control unit, e.g. automatic ingredient detection and/or sensing, level of fill of receptacles and reservoirs integrated in or associated with the machine, etc. . . . . . The control unit is selectively in:
  a first control mode in which the thermal device is powered so that said water located along the guide is thermally conditioned by the guide to reach a water temperature at guide exit that is at least close to a target temperature, e.g. within a range of 2 or 5 or 8° C. to a target temperature and/or to a target temperature in the range of 55 to 98° C., such as 70 to 95° C., e.g. 86 to 93° C., when the water is at room temperature at entry of the guide; and
  a second control mode different to the first control mode.
  For instance, the control unit is by default in the first control mode.

The control unit has a selection arrangement, e.g. a selection arrangement comprising a user-interface and/or a flavouring ingredient sensor, for selecting one of: a first beverage preparation mode using the first control mode; and a second beverage preparation mode using the second control mode.

The selection arrangement may be configured to select a particular volume of water of a plurality of selectable available volumes to be supplied to said water inlet for preparing a correspondingly resulting particular volume of the beverage. For instance, the selectable available volumes include about 15 ml, about 20 ml, about 25 ml, about, 30 ml, about 35 ml, about 40 ml and so on until about 200, 400, 700 or even 1000 ml. Examples of preparation regulations are disclosed in WO 2010/026053, WO 2014/090965 and PCT/EP18/085737.

An automatic capsule recognition system may be used to parameterize and adjust the processing of the flavouring ingredient contained in the above mentioned capsule automatically in line with the type of ingredient. Examples of such technologies and associated features are disclosed in WO2011/141532, WO2011/141535, WO 2012/010470, WO 2013/072239, WO 2013/072297, WO 2013/072326, WO 2013/072351 and WO 2015/044400.

Examples of user-interfaces are disclosed in WO 2015/096998.

In the second control mode, the thermal device is unpowered or powered at a powering level that is significantly below a powering level of the thermal device in the first control mode. For instance, the powering level in the second control mode is below 50%, such as below 25%, e.g. in the range of 0.5 to 15% of the powering level in the first control mode. Upon selection by the selection arrangement of the second beverage preparation mode, the control unit is configured: to switch the driving arrangement from the stationary to the driving mode and/or maintain the driving arrangement in the driving mode. For instance, the driving arrangement is switched from the stationary to the driving mode immediately when the second beverage preparation mode is selected or after a delay of up to 20 sec. such as up to 10 sec. e.g. up to 5 sec.

Hence, as opposed to prior art systems, when (substantially) thermally unconditioned water or water with a reduced thermal conditioning is to be used for the mixing with the flavouring ingredient, the water is not diverted via a dedicated channel around the thermal conditioner. The water is passed right through the thermal conditioner. At the beginning of such preparation cycle, residual thermal energy from a previous beverage preparation cycle may still lead to a transfer of energy between the water and the thermal conditioner. However, after a sufficient amount of water is passed through the (unpowered or reduced powered) thermal conditioner, the temperature of the total water of the beverage preparation cycle will average at a temperature that is closer to the temperature the water had before reaching the thermal conditioner, e.g. at or about room temperature.

Upon selection via the selection arrangement of the second beverage preparation mode, the control unit may switch itself from the second beverage preparation mode into the first beverage preparation mode: by selection via the selection arrangement of the first beverage preparation mode; or automatically after entry and subsequent exit of a standby mode (typically a machine low consumption energy mode at which at least some electrical components, e.g. necessary for beverage preparation and/or for data processing, are unpowered); or automatically at switching of the driving arrangement from the driving mode to the stationary mode. For instance, such automatic switching of the control unit and such switching of the driving arrangement occur both at the same time or within a time frame of up to 50 sec. for instance of 0.01 to 20 sec. such as of 1 to 10 sec. e.g. of 2 to 5 sec. Such time frame may be provided to allow a user to request a top up of the dispensed beverage, i.e. increase the dispensing volume.

To control the liquid driving arrangement and the thermal conditioner, the control unit may be connected to one or more of flow meters, pressure sensors and thermal sensors to monitor characteristics of the water, e.g. prior, in and/or after the thermal conditioner and/or in the processing unit.

In the first beverage preparation mode, the control unit may be prevented from switching the driving arrangement from the stationary to the driving mode before the guide is thermally conditioned by the thermal device to an extent that is sufficient to deliver the beverage within a target average temperature range, optionally the target temperature range having: a span of less than 5° C., such as less than 3° C., e.g. less than 2° C.; and/or a temperature in the range of 83° to 92° C.

The thermal conditioner may be such that, in the second beverage preparation mode, a given amount, for instance an amount in the range of 25 to 200 ml such as of 40 to 100 ml e.g. of 50 to 70 ml, of water at room temperature driven into the guide has at water exit of the guide an average temperature difference relative to the room temperature of less than 15° C., for instance less than 10° C., e.g. such as less than 5° C. or 2.5° C.

The conditioner's body can be a thermal accumulation body. The accumulation body may be a metal-based mass, e.g. made of at least one of aluminium, iron, nickel, copper, zinc, tin and lead. The accumulation body may have a heat capacity in the range of 50 to 1000 J/° C., such as 100 to 750 J/° C., e.g. 200 to 600 J/° C.

The thermal conditioner's guide may form a or the above duct through the thermal conditioner, the duct having an overall length along which the water is driven in the thermal conditioner by the liquid driving arrangement and an average transverse width, the duct having a ratio of the length over the average transverse width of at least 10, such as at least 20, for instance in the range of 30 to 1500, e.g. of 100 to 1000.

The thermal conditioner's guide can form a or the above duct through the thermal conditioner, the duct having an average transverse cross-section in the range of 1 to 20 mm$^2$, such as 3 to 15 mm$^2$, e.g. 5 to 10 mm$^2$.

The thermal device may have a thermal power in the range of 300 to 3000 watt, for instance of 500 to 2300 watt, such as of 700 to 1800 watt, e.g. of 950 to 1500 watt.

The processing unit can have a cover that has: an open position for inserting the flavouring ingredient prior to mixing and/or removing residual ingredient after mixing; and a closed position for mixing the flavouring ingredient with the water during beverage preparation.

The thermal conditioner may form a cavity delimiting or containing at least partly the cover when the holder and the cover are in the closed position and when the holder and the cover are in the open position and/or the thermal conditioner may surround entirely the beverage processing unit at a level of a flavouring ingredient insertion and/or removal mouth of the holder. For instance the thermal conditioner is movable together with the cover relative to a frame or an outside housing.

Examples of machines incorporating such an architecture and advantages associated therewith are disclosed in EP19167543.

The beverage outlet arrangement may extend between the holder and the cover and/or through the cover, the outlet arrangement being configured to deliver the beverage from the chamber. The outlet arrangement may be formed by a plurality of interstices between the holder and the cover.

For instance, the interstices are delimited by a peripheral part of the cover and a facing interface face of the capsule, e.g. a peripheral flange of the capsule. For example, the outlet arrangement is in a generally horizontal and/or planar arrangement at a periphery of the cover facing the holder in the closed position of the cover and the holder.

Examples of outlet arrangements are disclosed in WO 2009/106175, WO 2012/100836, WO 2013/020939 and WO 2017/068134.

The water inlet can extend through the cover to guide water into the chamber where it is mixed with the flavouring ingredient to form the beverage.

The inlet may include the features disclosed in WO 2010/063644.

The cover can be movable relative to a or the above mentioned frame or housing between the open and closed positions, the frame or housing being stationary when the beverage is being prepared from the ingredient in the chamber. For instance, the holder is stationary relative to the frame or outside housing when the cover and the holder are relatively moved between the open and closed positions. The cover can be pivotable relative to the frame or outside housing about a pivoting axis that is remote from the thermal conditioner, the pivoting axis and the thermal conditioner may be spaced by a spacing distance that is greater than a greatest dimension of the chamber.

The machine may include a functional block, such as a waste ingredient reservoir and/or a water reservoir. The cover may be pivotable relative to a or the above mentioned frame or outside housing about a or the above mentioned pivoting axis that is remote from the thermal conditioner. The functional block or an access to the functional block may be located in a space spacing the pivoting axis and the chamber. For instance, the cover is connected to the pivoting axis by a connection member, such as a connection member that covers the functional block when the cover and the holder are in the closed position and that uncovers the functional block when the cover and the holder are in the open position. For instance, the connection member forms an upper housing part.

During beverage preparation, the holder may be directly or indirectly connected to a driver, e.g. an electric motor, that is arranged to drive the holder in rotation.

The driver may be configured to centrifuge the chamber containing the flavouring ingredient and water delivered by the thermal conditioner into the chamber to: prepare the beverage; and/or deliver the beverage via the beverage outlet arrangement.

The conditioner's body may be a or the above thermal accumulation body, the body extending about a central axis of the beverage processing unit such as about a centrifugation axis.

The guide may form one or more peripheral loops, e.g. extending helicoidally about a or the above mentioned central axis, such as a centrifugation axis, of the beverage processing unit.

The thermal device can form a peripheral loop extending about a or the above mentioned central axis of the beverage processing unit, such as about a centrifugation axis.

The conditioner's body may be a or the above thermal accumulation body. The body can have a beverage collecting surface in thermal communication with the thermal device, the collecting surface being configured to collect the beverage delivered from the beverage outlet arrangement. The collecting surface may delimit at least part of an annular cavity facing e.g. surrounding the outlet arrangement, the cavity being for instance substantially U-shaped in cross-section such as an annular cavity having an outer beverage impact wall and an inner beverage confinement wall and a lower bottom. For example, the impact wall and/or the confinement wall are formed by the body and the bottom is formed by the body or by a component that is thermally substantially distinct thereto and that is significantly less thermally conductive than the body.

The collecting surface may include the features disclosed in WO 2013/020940.

The machine can have a discharge arrangement configured to guide the beverage from the beverage collecting surface to a dispensing area configured to receive a user-receptacle for collecting the beverage from such machine. The dispensing area may be delimited by an outside upright machine face and/or a cup support.

The discharge arrangement can have an upstream part that is stationary relative to a or the above mentioned cover of the beverage processing unit when the holder and the cover are relatively moved.

The discharge arrangement may have a downstream part that is stationary relative to the holder when the holder and a or the above mentioned cover are relatively moved.

The discharge arrangement can include a tubular part. For instance, the tubular part forms a or the above mentioned upstream part.

The discharge arrangement can include a downstream member, such as a downstream chamber for refining foam contained in the beverage e.g. by a refining arrangement such as one or more bubble dividers and/or a liquid diverting member that is configured to direct selectively the beverage to the dispensing area and waste liquid to a waste collector. For instance the downstream member forms a or the above mentioned downstream part.

The discharge arrangement can have at least one part, such as a or the above mentioned downstream part, that is removable by a user for cleaning and/or servicing.

The discharge arrangement can have a first part, such as a or the above mentioned upstream part, and a second part, such as a or the above mentioned downstream part, the second part being mounted in or to a or the above mentioned outside housing that is stationary when the beverage is being prepared from the flavouring ingredient in the chamber. The first part can be mounted in or to a connection member connecting a or the above mentioned cover to a guiding structure configured for enabling the holder and the cover to relatively move, e.g. pivotally and/or translationally, between their open and closed positions along the guiding structure, so that when the holder and the cover are in their closed position the first part projects into the outside housing and/or the second part projects into the connection member.

The discharge arrangement can include the configurations disclosed in PCT/EP18/085359, PCT/EP18/085360 and PCT/EP18/085763.

The machine may include a water source, such as a water tank, and an upstream water guide, e.g. a flexible guide, fluidically connected to the water source and to the thermal conditioner for guiding the water from the source to the conditioner. For instance, the water guide is associated with the liquid driving arrangement for driving the water from the source to the conditioner via the guide.

The holder and a or the above mentioned cover of the beverage processing unit are relatively movable, e.g. translationally and/or pivotally movable, between their open and closed positions along a guiding structure, the upstream water guide passing at or by the guiding structure. For instance, the upstream water guide is secured by the guiding structure and a water guide support.

The capsule holder and/or, when present, the cover may be drivable in rotation by a motorized drive axis, e.g. for centrifugation of the capsule.

For instance, the machine incorporates the features disclosed in WO 2008/148604, WO 2009/106598, WO 2014/096122 or WO 2014/096123.

The capsule holder and (when present) cover can be incorporated into an ingredient processing module of a beverage preparation device, typically of the centrifugal type, e.g. as disclosed in EP 2 000 062, EP 2 155 020, EP 152 128, WO 2008/148646, WO 2008/148650, WO 2008/148834, WO 2009/106175, WO 2009/106589, WO 2010/026045, WO 2010/026053, WO 2010/063644, WO 2010/066705, WO 2010/066736 and WO 2011/023711.

The capsule holder and cover may be secured together in their closed position by a corresponding arrangement, e.g. as disclosed in WO 2012/007293 and WO 2014/102048.

The machine (when using ingredient capsules) may have a capsule transfer device, e.g. as disclosed in WO 2012/041605, WO 2017/046294 and WO 2017/202746.

The beverage processing unit (when using ingredient capsules) may be fitted with an arrangement for opening the capsule, e.g. as disclosed in WO 2008/148656, WO 2010/026045 and WO 2010/066736.

The beverage processing unit (when using ingredient capsules) may be configured for receiving capsules of different sizes, e.g. as disclosed in WO 2011/023711.

The invention also relates to a combination of the machine as described above and the above mentioned flavouring ingredient, e.g. supplied within a capsule into the machine, for preparing the beverage in the machine.

Another aspect of the invention relates to a method of preparing, in the machine described above, the beverage from the above mentioned flavouring ingredient, e.g. supplied within a capsule into the machine. The method includes the steps of:

- placing the ingredient, e.g. supplied within the above mentioned capsule, into the mixing chamber delimited by the holder;
- selecting via the selection arrangement a beverage preparation mode selected from the first and second beverage preparation modes; and
- thereafter controlling by the control unit:
  - a) the powering of the thermal device to be in the first control mode, if the selected beverage preparation mode is the first beverage preparation mode, or in the second control mode, if the selected beverage preparation mode is the second beverage preparation mode; and
  - b) the liquid driving arrangement to switch it into or maintain it in the driving mode so as to drive the water along the guide of the thermal conditioner and into the inlet of the beverage processing unit.

When the selected beverage preparation mode is the second beverage preparation mode, the control unit switches the driving arrangement from the stationary to the driving mode and/or maintains the driving arrangement in the driving mode, optionally the driving arrangement being switched from the stationary to the driving mode immediately when the second beverage preparation mode is selected or after a delay of up to 20 sec. such as up to 10 sec. e.g. up to 5 sec.

Yet a further aspect of the invention relates to a use of the flavouring ingredient, such as of the above mentioned capsule containing the flavouring ingredient, for: preparing the beverage in a machine as described above; or implementing a combination as described above; or preparing the beverage by the method described above.

BRIEF DESCRIPTION OF THE DRAWINGS

The invention will now be described with reference to the schematic drawings, wherein:

FIG. 1 is a perspective view of part of a machine according to the invention with a holder and cover in the closed position;

FIG. 1a is a side view of the machine shown in FIG. 1 when the holder and cover are in the open position;

FIG. 2 is a perspective view of part of the machine shown in FIG. 1, showing the machine's thermal conditioner (after removal of part of the machine's upper housing), when the holder and cover are in the closed position;

FIG. 2a is a perspective view of part of the machine shown in FIG. 1, showing the machine's thermal conditioner (after removal of part of the machine's upper housing), when the holder and cover are in the open position;

FIG. 3 is a partly schematic, cross-sectional view of part of the machine shown in FIG. 1;

FIG. 4 is an enlarged view in cross-section of part of the thermal conditioner and discharge arrangement of the machine shown in FIG. 1, the holder and the cover being in their closed position; and FIG. 4a shows the parts illustrated in FIG. 4, when the holder and the cover are moved between their open and closed positions.

DETAILED DESCRIPTION

FIGS. 1 to 4a, in which the same numeric references generally designate the same parts, illustrate an exemplary embodiment of a machine 1 and parts thereof in accordance with the invention.

Machine 1 is configured for preparing a beverage 3 from a flavouring ingredient 2, e.g. coffee or tea or chocolate or cacao or milk or soup, by mixing water 4 with the flavouring ingredient, e.g. by centrifugally driving such flavouring ingredient with water 4

Machine 1 has a beverage processing unit 10,20 that includes a holder 10 delimiting a mixing chamber 11 in which the flavouring ingredient is received, e.g. within a capsule, held and mixed with water 4 during beverage preparation. For instance, holder 10 has an upwardly or sidewardly or slantingly oriented mouth via which the flavouring ingredient is received in the holder.

In one embodiment, the flavouring ingredient is supplied within a capsule into the chamber. The capsule may have a capsule flange that extends generally in parallel to the mouth (when present).

Beverage processing unit 10,20 has a beverage outlet arrangement 21 configured to deliver beverage 3 from the mixing chamber 11.

Beverage processing unit 10,20 includes a water inlet 22 configured to guide water 4 into mixing chamber 11 where it is mixed with flavouring ingredient 2 to form beverage 3.

Machine 1 includes a thermal conditioner 30, such as a heater and/or a cooler, that has a body 31.

Body 31 includes: a guide 32, such as a duct, for guiding water 4 towards beverage processing unit 10,20; and a thermal device 33, such as an electric thermal device, that is able to be powered to thermally conditioning guide 32 so as to thermally condition water 4 guided by guide 32. For instance, thermal device 33 has a heat remover and/or a heat generator, such as at least one of a thermocouple, a heat pump, a resistive heater e.g. a discrete resistor and/or a thick film heater, and an inductive heater.

Machine 1 has a liquid driving arrangement 5 that includes: a driving mode to drive water 4, e.g. from a water source such as a water tank 40 and/or an external water supply line, along guide 33 of thermal conditioner 30 and into the inlet 22; and a stationary mode in which water 4 remains substantially stationary along guide 33 of thermal conditioner 30 and optionally in inlet 22. For instance, driving arrangement 5 in the stationary mode being inactive or active merely to pressurise water 4 towards inlet 22.

Machine 1 includes a control unit 7, such as a control unit comprising a controller and/or processor 70, configured to control thermal device 33 and driving arrangement 5. Control unit 7 is selectively in:

- a first control mode in which thermal device 33 is powered so that water 4 located along guide 32 is thermally conditioned by guide 32 to reach a water temperature at guide exit that is at least close to a target temperature, e.g. within a range of 2 or 5 or 8° C. to a target temperature and/or to target temperature in the range of 55 to 98° C., such as 70 to 95° C., e.g. 86 to 93° C., when water 4 is at room temperature at entry of guide 32; and
- a second control mode different to the first control mode, optionally the control unit 7 being by default in the first control mode.

Control unit 7 may have a selection arrangement 71, e.g. a selection arrangement including a user-interface 71 and/or a flavouring ingredient sensor 71, for selecting one of: a first beverage preparation mode using the first control mode; and a second beverage preparation mode using the second control mode.

In the second control mode the thermal device is unpowered or powered at a powering level that is significantly below a powering level of the thermal device 33 in the first control mode, for instance a powering level in the second control mode that is below 50%, such as below 25%, e.g. in the range of 0.5 to 15% of the powering level in the first control mode.

Upon selection via selection arrangement 71 of the second beverage preparation mode, control unit 7 is configured to switch the driving arrangement 5 from the stationary to the driving mode and/or maintain driving arrangement 5 in the driving mode, optionally the driving arrangement being switched from the stationary to the driving mode immediately when the second beverage preparation mode is selected or after a delay of up to 20 sec. such as up to 10 sec. e.g. up to 5 sec.

Upon selection via selection arrangement 71 of the second beverage preparation mode, control unit 7 may be configured to switch itself from the second beverage preparation mode into the first beverage preparation mode: by selection via selection arrangement 71 of the first beverage preparation mode; or automatically after entry and subsequent exit of a standby mode; or automatically at switching of driving arrangement 5 from the driving mode to the stationary mode, optionally such automatic switching of control unit 7 and such switching of the driving arrangement 5 occurring both at the same time or within a time frame of up to 50 sec., for instance of 0.01 to 20 sec., such as of 1 to 10 sec., e.g. of 2 to 5 sec.

In the first beverage preparation mode, control unit 7 is prevented from switching driving arrangement 5 from the stationary to the driving mode before guide 32 is thermally conditioned by thermal device 33 to an extent that is sufficient to deliver beverage 3 within a target average temperature range. For instance, the target temperature range has: a span of less than 5° C., such as less than 3° C., e.g. less than 2° C.; and/or a temperature in the range of 83° to 92° C.

Thermal conditioner 30 can be such that, in the second beverage preparation mode, a given amount, for instance an amount in the range of 25 to 200 ml such as of 40 to 100 ml e.g. of 50 to 70 ml, of water 4 at room temperature driven into guide 33 has at water exit of guide 33 an average temperature difference relative to the room temperature of less than 15° C., for instance less than 10° C., e.g. such as less than 5° C. or 2.5° C.

The conditioner's body 31 may be a thermal accumulation body 31. Accumulation body 31 can be a metal-based mass, e.g. made of at least one of aluminium, iron, nickel, copper, zinc, tin and lead. Accumulation body 31 can have a heat capacity in the range of 50 to 1000 J/° C., such as 100 to 750 J/° C., e.g. 200 to 600 J/° C.

Guide 32 may form a or the above mentioned duct through thermal conditioner 30, the duct having an overall length along which water 4 is driven in thermal conditioner 30 by liquid driving arrangement 5 and an average transverse width, the duct having a ratio of the length over the average transverse width of at least 10, such as at least 20, for instance in the range of 30 to 1500, e.g. of 100 to 1000.

Guide 32 can form a or the above duct through thermal conditioner 30, the duct having an average transverse cross-section in the range of 1 to 20 mm$^2$, such as 3 to 15 mm$^2$, e.g. 5 to 10 mm$^2$.

Thermal device 33 may have a thermal power in the range of 300 to 3000 watt, for instance of 500 to 2300 watt, such as of 700 to 1800 watt, e.g. of 950 to 1500 watt.

Processing unit 10,20 may have a cover 20 that has an open position for inserting flavouring ingredient 2 prior to mixing and/or removing residual ingredient after mixing and a closed position for mixing flavouring ingredient 2 with water 4 during beverage preparation.

Thermal conditioner 30 may form a cavity delimiting or containing at least partly cover 20 when holder 10 and cover 20 are in the closed position and when holder 10 and cover 20 are in the open position and/or thermal conditioner 30 may surround entirely beverage processing unit 10,20 at a level of a flavouring ingredient insertion and/or removal mouth of holder 10. For instance thermal conditioner 30 is movable together with cover 20 relative to a frame or an outside housing 16.

Beverage outlet arrangement 21 can extend between holder 10 and cover 20 and/or through cover 20, the outlet arrangement 21 being configured to deliver beverage 3 from chamber 11. For instance, outlet arrangement 21 is formed by a plurality of interstices between holder 10 and cover 20.

Water inlet 22 can extend through cover 20 to guide water 4 into chamber 11 where it is mixed with flavouring ingredient 2 to form beverage 3.

Cover 20 can be movable relative to a or frame or housing 16 between the open and closed positions, frame or housing 16 being stationary when beverage 3 is being prepared from ingredient 2 in chamber 11. Holder 10 may be stationary relative to frame or outside housing 16 when cover 20 and holder 10 are relatively moved between the open and closed positions. For instance, cover 20 is pivotable relative to frame or outside housing 16 about a pivoting axis 25 that is remote from thermal conditioner 30. Pivoting axis 25 and thermal conditioner 30 may be spaced by a spacing distance that is greater than a greatest dimension of chamber 11.

Machine 1 may incorporate a functional block 40, such as a waste ingredient reservoir and/or a water reservoir. Cover 20 can be pivotable relative to a or the above mentioned frame or outside housing 16 about a or the abovementioned pivoting axis 25 that is remote from thermal conditioner 30. Block 40 or an access to block 40 may be located in a space 41 spacing pivoting axis 25 and chamber 11. Cover 20 can be connected to pivoting axis 25 by a connection member 26, such as a connection member 26 that covers block 40 when cover 20 and holder 10 are in the closed position and that uncovers functional block 40 when cover 20 and holder 10 are in the open position. The connection member may form an upper housing part 26.

During beverage preparation, holder 10 can be directly or indirectly connected to a driver 12, e.g. an electric motor, arranged to drive holder 10 in rotation.

Driver 12 can be configured to centrifuge chamber 11 containing flavouring ingredient 2 and water 4 delivered by thermal conditioner 30 into chamber 11 to: prepare beverage 3; and/or deliver beverage 3 via beverage outlet arrangement 21.

The conditioner's body 31 can be a or the above thermal accumulation body 31, accumulation body 31 extending about a central axis 19 of beverage processing unit 10,20, such as about a centrifugation axis 19.

Guide 32 can form one or more peripheral loops, e.g. extending helicoidally about a or the above central axis 19, such as a centrifugation axis 19, of beverage processing unit 10,20.

Thermal device 33 may form a peripheral loop extending about a or the above central axis 19 of beverage processing unit 10,20, such as about a centrifugation axis 19.

The conditioner's body 31 can be a thermal accumulation body 31, accumulation body 31 having a beverage collecting surface 35 in thermal communication with thermal device 33 configured to collect beverage 3 delivered from beverage outlet arrangement 21. Collecting surface 35 may delimit at least part of an annular cavity facing, e.g. surrounding, outlet arrangement 21. The cavity may be substantially U-shaped in cross-section. The annular cavity can have an outer beverage impact wall and an inner beverage confinement wall and a lower bottom. For instance, the impact wall and/or the confinement wall are formed by body 31 and the bottom being formed by body 31 or by a component that is thermally substantially distinct thereto and that is significantly less thermally conductive than body 31.

Machine 1 can include a discharge arrangement 36,37 configured to guide beverage 3 from beverage collecting surface 35 to a dispensing area 5 configured to receive a user-receptacle for collecting beverage 3 from such machine 1. Dispensing area 5 may be delimited by an outside upright machine face 51 and/or a cup support 52.

Discharge arrangement 36,37 may have an upstream part 36 that is stationary relative to a or the above mentioned cover 20 of beverage processing unit 10,20 when holder 10 and cover 20 are relatively moved.

Discharge arrangement 36,37 can incorporate a downstream part 37 that is stationary relative to holder 10 when holder 10 and a or the above mentioned cover 20 are relatively moved.

Discharge arrangement 36,37 can have a tubular part 36. For instance, tubular part 36 forms a or the above mentioned upstream part.

Discharge arrangement 36,37 may include a downstream member 37, such as a downstream chamber 37 for refining foam contained in beverage 3 e.g. by a refining arrangement such as one or more bubble dividers 37a,37b,37c,37d and/or a liquid diverting member 37 that is configured to direct selectively beverage 3 to dispensing area 5 and waste liquid to a waste collector 40. For instance, downstream member 37 forms a or the above mentioned downstream part.

Arrangement 36,37 may have at least one part, such as a or the above mentioned downstream part 37 that is removable by a user for cleaning and/or servicing.

Discharge arrangement 36,37 can have a first part, such as a or the above mentioned upstream part 36, and a second part, such as a or the above mentioned downstream part 37, the second part being mounted in or to a or the above mentioned outside housing 16 that is stationary when beverage 3 is prepared from flavouring ingredient 2 in chamber 11. The first part may be mounted in or to a connection member 26 connecting a or the above mentioned cover 20 to a guiding structure 25 configured for enabling holder 10 and cover 20 to relatively move, e.g. pivotally and/or translationally, between their open and closed positions along the guiding structure 25, so that when holder 10 and cover 20 are in their closed position the first part projects into the outside housing and/or the second part projects into connection member 26.

Machine 1 may include a water source 6, such as a water tank, and an upstream water guide 24, e.g. a flexible guide 24, fluidically connected to source 6 and to thermal conditioner 30 for guiding water 4 from source to conditioner 30. For instance, the water guide is associated with liquid driving arrangement 5 for driving water 4 from source 6 to conditioner 30 via guide 24.

Holder 10 and a or the above mentioned cover 20 of processing unit 10,20 can be relatively movable, e.g. translationally and/or pivotally movable, between their open and closed positions along a guiding structure 25, upstream water guide 24 passing at or by the guiding structure. Upstream water guide 24 may be secured by guiding structure 25 and a water guide support 25'.

To operate machine 1 so as to prepare beverage 3, the following steps can be carried out: ingredient 2, e.g. supplied within the above mentioned capsule, is placed into mixing chamber 11 delimited by the holder 10;

a mode selected from the first and second beverage preparation modes is selected via the selection arrangement 71; and thereafter, control unit 7 controls:
 a) powering of thermal device 33 to be in the first control mode, if the selected beverage preparation mode is the first beverage preparation mode, or in the second control mode, if the selected beverage preparation mode is the second beverage preparation mode; and
 b) liquid driving arrangement 5 to switch it into or maintain it in the driving mode so as to drive water 4 along guide 33 of thermal conditioner 30 and into inlet 22 of the beverage processing unit.

When the selected beverage preparation mode is the second beverage preparation mode, control unit 7 switches driving arrangement 5 from the stationary to the driving mode and/or maintains driving arrangement 5 in the driving mode, optionally driving arrangement 5 being switched from the stationary to the driving mode immediately when the second beverage preparation mode is selected or after a delay of up to 20 sec. such as up to 10 sec. e.g. up to 5 sec.

The invention claimed is:

1. A machine for preparing a beverage from a flavouring ingredient, the machine comprising:
 a beverage processing unit having:
  a holder defining a mixing chamber in which the flavouring ingredient is received, held, and mixed with water during a beverage preparation;
  a beverage outlet arrangement configured to deliver the beverage from the mixing chamber;
  a water inlet configured to guide the water into the mixing chamber to be mixed with the flavouring ingredient to form the beverage;
 a thermal conditioner that has a body comprising:
  a guide configured for guiding the water towards the beverage processing unit; and
  a thermal device that is able to be powered to thermally condition the guide so as to thermally condition the water guided by the guide;
 a liquid driving arrangement having a driving mode configured to drive the water along the guide of the thermal conditioner and into the water inlet and a stationary mode in which the water remains substantially stationary along the guide of the thermal conditioner and the liquid driving arrangement to pressurize the water towards the water inlet; and
 a control unit comprising a controller and/or processor, the control unit configured to control the thermal device and the liquid driving arrangement,
 the control unit being selectively in:
  a first control mode in which the thermal device is powered so that the water located along the guide is thermally conditioned by the guide to reach a water temperature at a guide exit that is at least close to a target temperature; and
  a second control mode different than the first control mode,
  the control unit having a selection arrangement for selecting one of: a first beverage preparation mode using the first control mode; and a second beverage preparation mode using the second control mode, in the second control mode the thermal device is unpowered or powered at a powering level below a powering level of the thermal device in the first control mode; and upon selection via the selection arrangement of the second beverage preparation mode, the control unit is configured to switch the liquid driving arrangement from the stationary mode to the driving mode and/or maintain the liquid driving arrangement in the driving mode, wherein the beverage processing unit includes a cover that is movable between an open position for inserting the flavouring ingredient prior to mixing and/or removing residual ingredient after mixing and a closed position for mixing the flavouring ingredient with the water during the beverage preparation, and wherein the thermal conditioner is movable together with the cover.

2. The machine of claim 1, wherein, upon selection via the selection arrangement of the second beverage preparation mode, the control unit is configured to switch from the second beverage preparation mode into the first beverage preparation mode:

by selection via the selection arrangement of the first beverage preparation mode;

automatically after entry and subsequent exit of a standby mode; or automatically at switching of the liquid driving arrangement from the driving mode to the stationary mode.

3. The machine of claim 1, wherein, in the first beverage preparation mode, the control unit is prevented from switching the liquid driving arrangement from the stationary mode to the driving mode before the guide is thermally conditioned by the thermal device to deliver the beverage within a target average temperature range, the target temperature range having:

a span of less than 5° C., and a temperature in the range of 83° to 92° C.

4. The machine of claim 1, wherein the thermal conditioner is such that, in the second beverage preparation mode, an amount of the water at 20° C. driven into the guide has an average temperature difference relative to the room temperature of less than 15° C. at water exit of the guide.

5. The machine of claim 1, wherein the thermal conditioner comprises one or more of the features selected from the group consisting of:

the guide forms a duct through the thermal conditioner, the duct having an overall length along which the water is driven in the thermal conditioner by the liquid driving arrangement and an average transverse width, the duct having a ratio of the overall length over the average transverse width of at least 10;

the guide forms a duct through the thermal conditioner, the duct having an average transverse cross-section in the range of 1 to 20 mm$^2$; and the thermal device has a thermal power in the range of 300 to 3000 watt.

6. The machine of claim 1, wherein the cover is movable relative to a frame or housing between the open position and the closed position, the frame or housing being stationary when the beverage is being prepared from the ingredient in the mixing chamber.

7. The machine of claim 1, which comprises a functional block, and wherein the cover is pivotable relative to a frame about a pivoting axis that is remote from the thermal conditioner, the functional block being located in a space spacing the pivoting axis and the chamber.

8. The machine of claim 1, wherein, during the beverage preparation, the holder is directly or indirectly connected to a driver.

9. The machine of claim 1, wherein the body of the thermal conditioner has a beverage collecting surface in thermal communication with the thermal device and configured to collect the beverage delivered from the beverage outlet arrangement.

10. The machine of claim 9, further comprising a discharge arrangement configured to guide the beverage from the beverage collecting surface to a dispensing area configured to receive a user-receptacle for collecting the beverage from the machine.

11. The machine of claim 1, further comprising a water source and an upstream water guide fluidically connected to the water source and to the thermal conditioner for guiding the water from the water source to the thermal conditioner.

12. A combination of a machine for preparing a beverage from a flavouring ingredient and the flavouring ingredient supplied within a capsule into the machine for preparing the beverage in the machine, the machine comprising:

a beverage processing unit having:
  a holder defining a mixing chamber in which the flavouring ingredient is received, held, and mixed with the water during a beverage preparation;
  a beverage outlet arrangement configured to deliver the beverage from the mixing chamber;
  a water inlet configured to guide water into the mixing chamber to be mixed with the flavouring ingredient to form the beverage;

a thermal conditioner that has a body comprising:
  a guide configured for guiding the water towards the beverage processing unit; and
  a thermal device that is able to be powered to thermally condition the guide so as to thermally condition the water guided by the guide;

a liquid driving arrangement having a driving mode configured to drive the water along the guide of the thermal conditioner and into the water inlet and a stationary mode in which the water remains substantially stationary along the guide of the thermal conditioner and the liquid driving arrangement to pressurize the water towards the water inlet; and a control unit comprising a controller and/or processor, the control unit configured to control the thermal device and the liquid driving arrangement, the control unit being selectively in:
  a first control mode in which the thermal device is powered so that water located along the guide is thermally conditioned by the guide to reach a water temperature at guide exit that is at least close to a target temperature; and
  a second control mode different than the first control mode,
  the control unit having a selection arrangement for selecting one of: a first beverage preparation mode using the first control mode; and a second beverage preparation mode using the second control mode,
  in the second control mode the thermal device is unpowered or powered at a powering level below a powering level of the thermal device in the first control mode; and
  upon selection via the selection arrangement of the second beverage preparation mode, the control unit is configured to switch the liquid driving arrangement from the stationary mode to the driving mode and/or maintain the liquid driving arrangement in the driving mode, wherein the beverage processing unit includes a cover that is movable between an open position for inserting the flavouring ingredient prior to mixing and/or removing residual ingredient after mixing and a closed position for mixing the flavouring ingredient with the water during the beverage preparation, and wherein the thermal conditioner is movable together with the cover.

13. The machine of claim 1, wherein the thermal device comprises a heat remover and/or a heat generator.

14. The machine of claim 1, wherein the stationary mode is an inactive mode or an active mode.

15. The machine of claim 1, wherein the powering level of the second control mode is below 50% of the powering level of the first control mode.

16. The machine of claim 1, wherein the liquid driving arrangement is switched from the stationary mode to the driving mode immediately when the second beverage preparation mode is selected or after a delay of up to 20 seconds.

17. The machine of claim 6, wherein the holder is stationary relative to the frame or housing when the cover and the holder are moved between the open position and the closed position.

18. The combination of claim 12, wherein the stationary mode is an inactive mode or an active mode.

19. The combination of claim 12, wherein the powering level in the second control mode is below 50% of the powering level in the first control mode.

\* \* \* \* \*